US010520523B2

(12) United States Patent
Farokhi et al.

(10) Patent No.: US 10,520,523 B2
(45) Date of Patent: Dec. 31, 2019

(54) FLUID MOVEMENT SENSOR WITH INSTRUMENTED CENTERBODY

(71) Applicants: University of Kansas, Lawrence, KS (US); FW Aero LLC, Lawrence, KS (US)

(72) Inventors: Saeed Farokhi, Lawrence, KS (US); Shawn S. Keshmiri, Lawrence, KS (US); Ray R. Taghavi, Lawrence, KS (US); Kyle Kristopher Wetzel, Lawrence, KS (US)

(73) Assignees: University of Kansas, Lawrence, KS (US); FW Aero LLC, Lawrence, KS (US)

( * ) Notice: Subject to any disclaimer, the term of this patent is extended or adjusted under 35 U.S.C. 154(b) by 0 days.

(21) Appl. No.: 16/268,261

(22) Filed: Feb. 5, 2019

(65) Prior Publication Data

US 2019/0242923 A1    Aug. 8, 2019

Related U.S. Application Data

(60) Provisional application No. 62/627,073, filed on Feb. 6, 2018.

(51) Int. Cl.
*G01P 5/02* (2006.01)
*G01K 13/02* (2006.01)

(52) U.S. Cl.
CPC .............. *G01P 5/02* (2013.01); *G01K 13/02* (2013.01); *G01K 2013/024* (2013.01)

(58) Field of Classification Search
CPC .......... G01P 5/165; G01P 13/025; G01P 5/16; G01P 15/18; G01P 21/00; G01P 21/025;
(Continued)

(56) References Cited

U.S. PATENT DOCUMENTS 2,992,557 A    7/1961   Bosse
3,116,639 A    1/1964   Bird
(Continued)

FOREIGN PATENT DOCUMENTS

WO    WO 2006/075158    7/2006

OTHER PUBLICATIONS

International Search Report and Written Opinion for PCT/US2019/016772, dated Apr. 9, 2019, 10 pages.

*Primary Examiner* — Andre J Allen
(74) *Attorney, Agent, or Firm* — Ray Quinney & Nebeker P.C.; Paul N. Taylor (57) ABSTRACT

A fluid sensing device includes an outer shell, a three-axis force and moment balance, a strut, and a centerbody. The outer shell has an inlet at a first end of the outer shell, an aft vent at an opposing second end of the outer shell, and an interior space connecting the inlet and the aft vent. The three-axis force and moment balance is positioned in the interior space of the outer shell. The strut is connected to the outer shell and the three-axis force and moment balance such that the strut supports the three-axis force and moment balance in the interior space. At least a portion of the centerbody is positioned in the interior space of the outer shell. The centerbody is connected to the three-axis force and moment balance such that the three-axis force and moment balance is configured to measure force, moment, and/or movement of the centerbody.

20 Claims, 4 Drawing Sheets

(58) Field of Classification Search
CPC .... G01P 3/806; G01P 1/10; G01P 3/62; G01P 5/02; G01P 5/12; G01P 5/175
See application file for complete search history.

(56) References Cited

U.S. PATENT DOCUMENTS

| | | |
|---|---|---|
| 3,345,866 A | 10/1967 | Crumpler |
| 3,683,691 A | 8/1972 | Kivenson |
| 9,541,429 B2 * | 1/2017 | Farokhi .................. G01P 5/165 |
| 2006/0058928 A1 | 3/2006 | Beard et al. |
| 2014/0191084 A1 | 7/2014 | Gambino et al. |
| 2015/0330310 A1 * | 11/2015 | deGaribody ............ G01S 17/58 701/100 |
| 2017/0122973 A1 | 5/2017 | Farokhi et al. |
| 2018/0321272 A1 * | 11/2018 | Farokhi .................... G01F 1/46 |

* cited by examiner

FLUID MOVEMENT SENSOR WITH INSTRUMENTED CENTERBODY

CROSS-REFERENCE TO RELATED APPLICATIONS

This application claims priority to and the benefit of U.S. Provisional Patent Application Ser. No. 62/627,073, titled "FLUID MOVEMENT SENSOR WITH INSTRUMENTED CENTERBODY" filed Feb. 6, 2018, the disclosure of which is incorporated herein by reference.

BACKGROUND

Background and Relevant Art

Fluid flow velocity measurements are typically determined by measuring pressure using some variation of a Pitot tube. The accuracy of these measurements, however, may be limited at high/low fluid flow velocities and/or in conditions when the flow is not parallel to the measuring device. For example, in aircraft or marine craft applications, measurement accuracy may suffer when the craft is changing direction or otherwise inducing pitch and/or yaw angles, such as during intense maneuvering, landing or takeoff, or in loss of control situations, which are often among the situations where reliable airspeed data is typically most needed.

In order to operate in such dynamic fluid flow environments, typical fluid flow sensor systems require multiple sensors positioned at separate locations on the craft or other measuring structure as well as complex compensation calculations to interpret the separate readings and compensate for angular flow errors in the sensor output. The requirement of multiple sensors and the necessity of gathering and interpreting separate signals into a meaningful measurement undesirably adds to the cost, complexity and accuracy of fluid sensing, particularly in dynamic fluid flow environments.

In addition, typical devices used for measuring fluid flow parameters are configured to measure a single parameter only and/or are unable to provide accurate readings at high/low fluid flow velocities and/or indirect flow angles. Typical systems intended to measure more than one fluid parameter may thus require multiple sensors, and the use of multiple sensors may result in readings that are not common to a localized area and/or that are not simultaneous, limiting the usefulness of the resulting readings for measuring certain fluid parameters.

Furthermore, inaccuracy of typical devices used for measuring angular fluid flow parameters propagates into estimation of local wind velocity and causes overestimation or underestimation of the wind speed. Systems for improving accuracy of measuring angular fluid flow parameters are described in U.S. Pat. No. 9,541,429, the disclosure of which is incorporated herein by reference in its entirety. However, such systems calculate and/or estimate turbulence and directionality of the angular flow through relative pressure measurements. Direct measurement of angular fluid flow may be desirable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a fluid sensing device includes an outer shell, a three-axis force and moment balance, a strut, and a centerbody. The outer shell has an inlet at a first end of the outer shell, an aft vent at an opposing second end of the outer shell, and an interior space connecting the inlet and the aft vent. The three-axis force and moment balance is positioned in the interior space of the outer shell. The strut is connected to the outer shell and the three-axis force and moment balance such that the strut supports the three-axis force and moment balance in the interior space. At least a portion of the centerbody is positioned in the interior space of the outer shell. The centerbody is connected only to the three-axis force and moment balance such that the three-axis force and moment balance is configured to measure force, moment, and/or movement of the centerbody relative to the outer shell.

In some embodiments, a method of measuring fluid movement data from a fluid stream includes positioning a fluid sensing device in a fluid stream where the fluid stream has an orientation and the fluid sensing device has a longitudinal axis, and the fluid stream orientation and the longitudinal axis are not parallel and contacting the fluid stream with a centerbody of the fluid sensing device. The method further includes measuring with the fluid sensing device an x-direction of unsteady force relative to time ($F_x(t)$) of the fluid stream in the direction of the longitudinal axis, a y-direction of unsteady force relative to time ($F_y(t)$) of the fluid stream transverse to the longitudinal axis, and a z-direction of unsteady force relative to time ($F_z(t)$) of the fluid stream transverse to the x-direction and the y-direction and in the direction of gravity of the fluid stream and then calculating a fluid stream velocity magnitude and fluid stream orientation relative to the longitudinal axis from the measured x-direction force relative to time ($F_x(t)$), y-direction force relative to time ($F_y(t)$), and z-direction force relative to time ($F_z(t)$).

In some embodiments, a method of measuring fluid turbulence in real time includes receiving an unsteady or fluctuating fluid speed magnitude and a fluid speed orientation of a fluid stream; measuring an x-direction of unsteady force relative to time ($F_x(t)$), a y-direction of unsteady force relative to time ($F_y(t)$), and a z-direction of unsteady force relative to time ($F_z(t)$) of the fluid stream; calculating a velocity fluctuation in at least the y-direction and z-direction; and reporting the velocity fluctuation as turbulence intensity to a user in real time.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-1 is a side cross-sectional view of a fluid sensing device, according to an embodiment of the present disclosure;

FIG. 1-2 is a side cross-sectional view of another fluid sensing device, according to an embodiment of the present disclosure;

FIG. 1-3 is an end view of yet another fluid sensing device, according to an embodiment of the present disclosure;

DETAILED DESCRIPTION

This disclosure generally relates to a fluid sensing device. In some embodiments, the fluid sensing device may be positioned on the exterior surface of a vehicle. For example, the fluid sensing device may be positioned on the exterior surface of a manned or unmanned aerial vehicle, such as an airplane, a helicopter, a dirigible, a drone, or other aerial vehicle. In other examples, the fluid sensing device may be positioned on the exterior surface of a ground- or water-based vehicle, such as an automobile, submarine, or a boat. In some embodiments, the fluid sensing device may be configured to sense the movement of air. For example, the fluid sensing device may be an air data sensing device. In other examples, the fluid sensing device may be configured to sense movement of other fluids, such as water.

In some embodiments, a fluid sensing device may include an outer shell with an interior space therethrough. The interior space may receive an airstream at an inlet and exhaust the airstream at an aft vent. The fluid sensing device may include a centerbody positioned in the interior space in the airstream. The centerbody may be supported relative to the outer shell by a force and moment balance. In some embodiments, the force balance may be a three-axis force and moment balance configured to measure force and moments in the x-direction (parallel to a longitudinal axis of the outer shell), the z-direction (perpendicular to the x-direction), and the y-direction (perpendicular to both the x-direction and the z-direction). In other embodiments, the force and moment balance may be configured to measure the x-direction, y direction, and z-direction moments of the centerbody as the centerbody moves relative to the outer shell. In such embodiments, the force and moment balance may be a six degrees-of-freedom (6 DOF) sensor.

Figure 11:
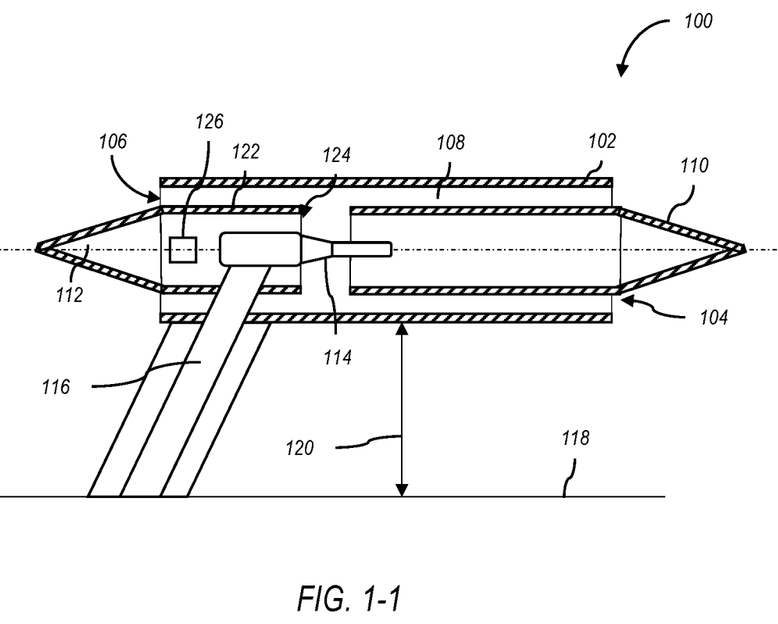

FIG. 1-1 illustrates an embodiment of a fluid sensing device 100 according to the present disclosure. In some embodiments, the fluid sensing device 100 includes an outer shell 102 with an inlet 104 positioned at a first end and an aft vent 106 positioned at an opposing second end. The outer shell 102 may define an interior space 108 oriented longitudinally through the outer shell 102 connecting the inlet 104 to the aft vent 106. In some embodiments, the outer shell 102 may be substantially cylindrical. In other embodiments, the outer shell 102 may have other, non-circular transverse cross-sections, such as rectangular, pentagonal, octagonal, other regular polygonal, elliptical, irregular, or combinations thereof.

The interior space 108 of the outer shell 102 may have one or more components of the fluid sensing device 100 positioned therein. In some embodiments, a centerbody 110 may be positioned in the interior space 108 and may be movable relative to the outer shell 102. In some embodiments, the centerbody 110 may be positioned centered in the interior space 108 along a longitudinal axis 112 of the interior space 108. In some embodiments, the longitudinal axis 112 may further be a central longitudinal axis of the outer shell 102 (e.g., the longitudinal axis of the cylinder), while in other embodiments, the longitudinal axis 112 of the interior space 108 may be parallel but not coaxial with that of the outer shell 102. The centerbody 110 may have a contour that tapers in the fore direction, as shown. For example, the contour may be conical or may be formed with an ellipsoid of revolution shape or ogive shape (e.g., tangent ogive, elliptical ogive, von Karman ogive, or other shapes).

The centerbody 110 may extend beyond the inlet 104 a distance in the fore direction, as illustrated. The length at which the centerbody 110 extends beyond the inlet 104 and the diameter of the outer shell 102 (e.g., the inner diameter) can define an L/D ratio of the fluid sensing device 100. The L/D ratio range is a design parameter and may vary based on specific application. In some embodiments, the L/D ratio may be in a range having an upper value, a lower value, or upper and lower values including any of 0.1, 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0. For example, the L/D ratio may vary from 0.1 to 5, or from 0.25 to 3, or from 0.5 to 1.5.

The diameter of the outer shell 102 (e.g., the inner diameter of the outer shell) and the diameter of the centerbody 110 (e.g., the outer diameter of the inner body) can define a $D_o/D_i$ ratio of the fluid sensing device 100. The $D_o/D_i$ ratio range is a design parameter and may vary based on specific application. In some embodiments, the $D_o/D_i$ ratio may be in a range having an upper value, a lower value, or upper and lower values including any of 1.25, 1.5, 1.75, 2.0, 2.25, 2.5, 2.75, 3.0, 3.25, 3.5, 3.75, 4.0, 4.25, 4.5, 4.75, or 5.0. For example, the $D_o/D_i$ may range from 1.25 to 5, or from 1.5 to 3.

In some embodiments, the centerbody 110 may be supported in the interior space 108 by a force and moment balance 114. The centerbody 110 may contact or be connected to the fluid sensing device 100 at no other location, such that the centerbody 110 is solely supported by the force and moment balance 114. As such, force applied to the centerbody 110 and/or movement of the centerbody 110 relative to the outer shell 102 of the fluid sensing device 100 may be measured by the force and moment balance 114.

In some embodiments, the force balance 114 may be a three-axis force and moment balance that is configured to measure forces and moments applied thereto in the x-direction (i.e., in the direction of the longitudinal axis 112), the y-direction (transverse to the x-direction and normal to FIG. 1), and the z-direction (transverse to the x-direction and the y-direction). In at least one embodiment, the force and moment balance 114 may be configured to measure force, moment and/or movement of the centerbody 110 with six degrees of freedom. In such embodiments, the force and moment balance may be a six degrees-of-freedom (6 DOF) sensor.

The force and moment balance 114 may be supported by a strut 116 that is also connected to the outer shell 102. The strut 116, therefore, may support the force and moment balance 114 relative to the outer shell 102. The strut 116 may also support the outer shell 102 relative to a mounting surface 118. The mounting surface may be any surface of a vehicle or object that a user desires to measure a fluid flow over and/or near. In some embodiments, the mounting surface 118 may be a fuselage of an aerial vehicle. In other embodiments, the mounting surface 118 may be the body of an automobile. In yet other embodiments, the mounting surface 118 may be a hull of a boat or a submarine.

In some embodiments, the strut 116 may provide a clearance 120 between the outer shell 102 and the mounting surface 118 that is sufficient to limit airflow interference from the mounting surface 118 (e.g., deflection or disturbance of the airflow by the mounting surface 118). In at least one embodiment, the clearance 120 may be less than 6 inches (15.24 centimeters). In some embodiments, the clearance 120 may be greater than 6 inches (15.24 centimeters). In other embodiments, the clearance 120 may be greater than 8 inches (20.32 centimeters). In yet other embodiments, the clearance 120 may be greater than 10 inches (25.4 centimeters). In other embodiments, the clearance 120 may be greater than 12 inches (30.48 centimeters), depending on the vehicle and application.

The centerbody 110 may be positioned in the interior space 108 and configured to induce the Coanda effect in at least a portion of a fluid contacting the centerbody 110 at an angle transverse to the longitudinal axis 112 of the centerbody 110. As the fluid moves from the inlet 104 and longitudinally past the centerbody 110, the fluid may approach an aft body 122. In some embodiments, the aft body 122 may be an aft stagnation chamber. The aft body 122 may be positioned at least partially in the interior space 108 aft of and sharing a longitudinal axis with (i.e., aligned with) the centerbody 110. The aft body 122 may include an opening 124 oriented toward the inlet 104 of the outer shell 102, and the aft body 122 housing one or more aft body sensors 126.

As shown, the aft body 122 may extend a distance beyond the outer shell 102 in an aft direction. In other embodiments, the aft body 122 may be disposed fully within the outer shell 102. The aft body 122 may be formed with a circular cross-section, as shown (e.g., as a stagnation tube). In other embodiments, an aft body may be formed with an ovoid cross-section, or with a triangular, square, rectangular, or other polygonal cross-section.

The diameter of the outer shell 102 (e.g., the inner diameter of the outer shell) and the diameter of the aft body 122 (e.g., the outer diameter of the aft body) can define a $D_o/D_a$ ratio of the fluid sensing device 100. The $D_o/D_a$ may ratio range is a design parameter and may vary based on specific application. In some embodiments, the $D_o/Da$ ratio may be in a range having an upper value, a lower value, or upper and lower values including any of 1.1, 1.25, 1.5, 1.75, 2.0, 2.25, 2.5, 2.75, 3.0, 3.25, 3.5, 3.75, 4.0, 4.25, 4.5, 4.75, or 5.0. For example, the $D_o/D_a$ ratio may range from 1.1 to 5, or from 1.25 to 3.

The length of the outer shell 102 and the length of the aft body 122 can define a $L_o/L_a$ ratio of the fluid sensing device 100. The $L_o/L_a$ ratio is a design parameter and may vary based on specific application. In some embodiments, the $L_o/L_a$ ratio may be in a range having an upper value, a lower value, or upper and lower values including any of 1.5, 1.75, 2.0, 2.25, 2.5, 2.75, 3.0, 3.25, 3.5, 3.75, or 4.0. For example, the $L_o/L_a$ ratio may range from 1.5 to 4, or from 1.75 to 3.5, or from 2 to 3.

Figure 12:
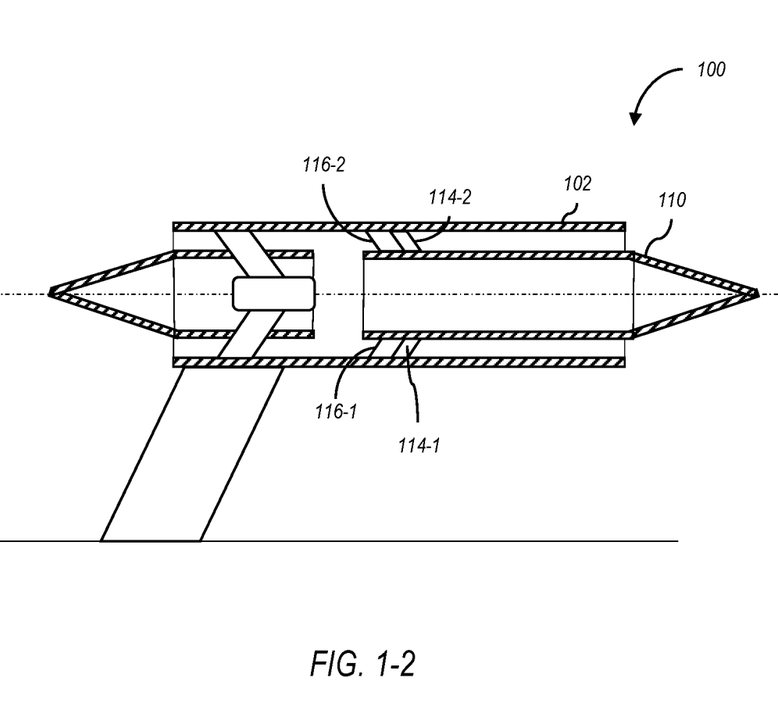

FIG. 1-2 is a side cross-sectional view of alternative embodiment of a fluid sensing device 100 according to the present disclosure. The centerbody 110 is supported by a plurality of struts 116-1, 116-2 extending between the outer shell 102 and the centerbody 102. In some embodiments, the plurality of struts 116-1, 116-2 includes two struts. The two struts 116-1, 116-2 may be rotationally opposing one another across the centerbody 110. In other words, the two struts 116-1, 116-2 may be positioned 180° from one another on opposite sides of the centerbody 110. In other embodiments, the struts 116-1, 116-2 may be positioned at uneven intervals around the centerbody 110. For example, the struts 116-1, 116-2 may be positioned 90° from one another. In another example, the struts 116-1, 116-2 may be positioned 120° from one another. In another example, the struts 116-1, 116-2 may be positioned at any spacing around the centerbody 110.

The struts 116-1, 116-2 may include one or more force and moment balance 114-1, 114-2 that individually or collectively measure 3- or 6-axis force applied to and/or movement and rotation of the centerbody 110 relative to the outer shell 102. For example, a first force and moment balance 114-1 may measure the rotational moments on the centerbody 110 relative to the outer shell 102, and a second force and moment balance 114-2 may measure translational forces on the centerbody 110 relative to the outer shell 102. In other examples, the first force and moment balance 114-1 and second force and moment balance 114-2 may work in concert to measure the movement of and/or translational and rotational forces applied to the centerbody 110. For example, the first force and moment balance 114-1 and second force and moment balance 114-2 may each be strain gauges that are incorporated into the first strut 116-1 and second strut 116-2, respectively. The strain gauges may measure the strain experienced by the struts 116-1, 116-2 when the centerbody 110 is deflected by a fluid flow through the fluid sensing device 100. In this manner, the individual force and moment balances 114-1, 114-2 of the struts 116-1, 116-2 should be collectively considered to be a unified force and moment balance.

Figure 13:
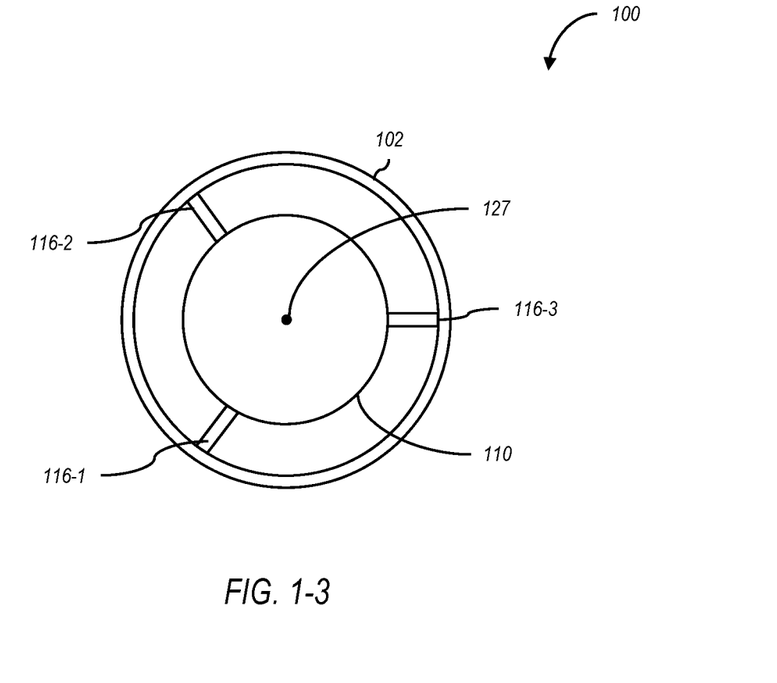

FIG. 1-3 is an end view of another alternative embodiment of a fluid sensing device 100. In some embodiments, the fluid sensing device 100 has a centerbody 110 that is supported by three of more struts 116-1, 116-2, 116-3 extending from the outer shell 102 to the centerbody 110. In some embodiments, each of the struts 116-1, 116-2, 116-3 includes a force and moment balance. In other embodiments, less than all of the struts 116-1, 116-2, 116-3 include a force and moment balance.

The struts 116-1, 116-2, 116-3 are illustrated in FIG. 1-3 as being oriented at equal angular intervals around the longitudinal axis 127. For example, the three struts 116-1, 116-2, 116-3 are positioned at 120° intervals from one another around the longitudinal axis 127. In other embodiments, the struts 116-1, 116-2, 116-3 may be positioned at uneven angular intervals around the longitudinal axis 127. For example, the first strut 116-1 and second strut 116-2 may be positioned at 90° angular spacing and the second strut 116-2 and third strut 116-3 may be positioned at 135° angular spacing. In another example, the first strut 116-1 and second strut 116-2 may be positioned at 90° angular spacing and the second strut 116-2 and third strut 116-3 may be positioned at 90° angular spacing. In yet another example, the first strut 116-1 and second strut 116-2 may be positioned at 120° angular spacing and the second strut 116-2 and third strut 116-3 may be positioned at 90° angular spacing.

Figure 2:
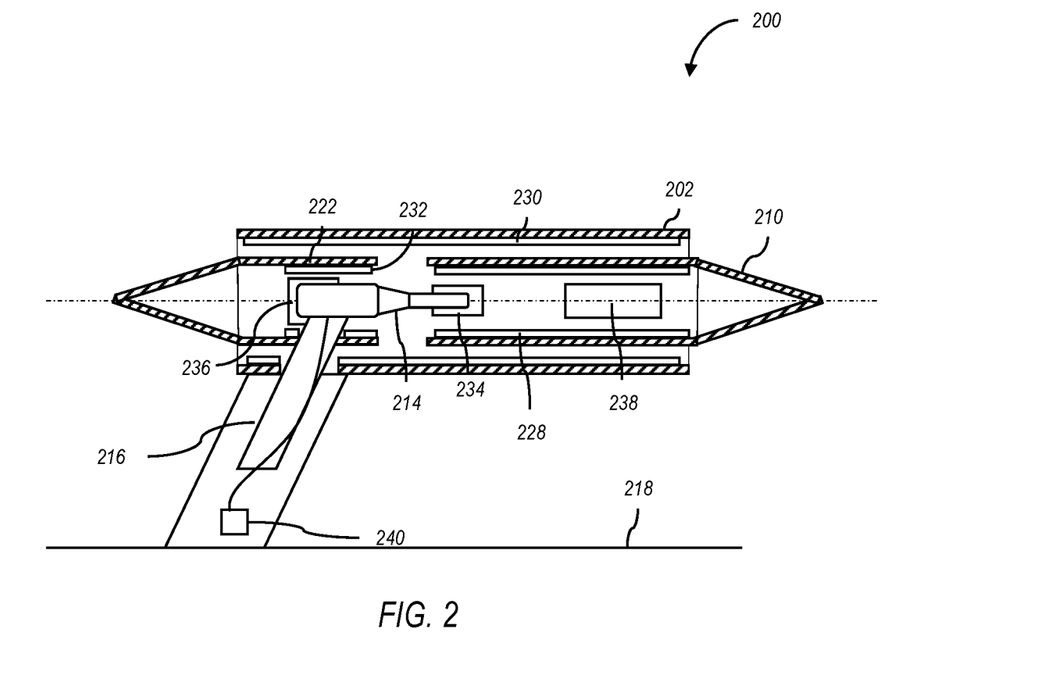
FIG. 2 is a side cross-sectional view of a fluid sensing device with body axes and the direction of gravity, according to an embodiment of the present disclosure.

FIG. 2 is a side cross-sectional view of another embodiment of a fluid sensing device 200 according to the present disclosure. The fluid sensing device 200 may include one or more features to limit and/or prevent the accumulation of ice on the fluid sensing device 200. In some embodiments, the fluid sensing device 200 may include a centerbody heating element 228 positioned in and/or on a surface of the centerbody 210. The centerbody heating element 228 may produce thermal energy to melt and/or prevent the accumulation of ice on the centerbody 210. In some embodiments, the centerbody heating element 228 may be positioned along a full length of the centerbody 210. In other embodiments, the centerbody heating element 228 may be positioned along a portion of the length of the centerbody 210 that is less than the full length. For example, the centerbody heating element 228 may be between 50% and 95% of the length of the centerbody 210. In other examples, the centerbody heating element 228 may be between 60% and 80% of the length of the centerbody 210. In yet other examples, the centerbody heating element 228 may be less than 75% of the length of the centerbody 210.

In some embodiments, the fluid sensing device 200 may include an outer shell heating element 230 positioned in and/or on an inner surface of the outer shell 202. The outer shell heating element 230 may produce thermal energy to melt and/or prevent the accumulation of ice on the outer shell 202. In some embodiments, the outer shell heating element 230 may be positioned along a full length of the outer shell 202. In other embodiments, the outer shell heating element 230 may be positioned along a portion of the length of the outer shell 202 that is less than the full length. For example, the outer shell heating element 230 may be positioned in the portion of the outer shell 202 that is longitudinally aligned with the centerbody 210. In other examples, the outer shell heating element 230 may be positioned at least in the portion of the outer shell 202 that is longitudinally aligned with the centerbody 210. In yet other examples, the outer shell heating element 230 may be between 50% and 95% of the length of the outer shell 202. In further examples, the outer shell heating element 230 may be less than 75% of the length of the outer shell 202. In yet further examples, the outer shell heating element 230 may be less than 50% of the length of the outer shell 202.

In some embodiments, the fluid sensing device 200 may include an aft body heating element 232 positioned in and/or on an inner surface of the aft body 222. The aft body heating element 232 may produce thermal energy to melt and/or prevent the accumulation of ice on the centerbody aft body 222. In some embodiments, the aft body heating element 232 may be positioned along a full length of the aft body 222. In other embodiments, the aft body heating element 232 may be positioned along a portion of the length of the aft body 222 that is less than the full length. For example, the aft body heating element 232 may be positioned in the portion of the aft body 222 that is longitudinally aligned with the outer shell 202. In yet other examples, the aft body heating element 232 may be between 50% and 95% of the length of the aft body 222. In further examples, the aft body heating element 232 may be less than 75% of the length of the aft body 222. In yet further examples, the aft body heating element 232 may be less than 50% of the length of the aft body 222. In heating mode, the heating elements may consume 50-80 Watts or more power based on specific altitude and air vehicle application.

In some embodiments, heating of the centerbody 210 and/or the aft body 222 near the force and moment balance 214 may affect the measurements by the force and moment balance 214 of forces, moments and/or movement of the centerbody 210. The fluid sensing device 200 may include one or more thermal insulation layers to limit and/or prevent the measurements by the force balance 214 being affected by the centerbody heating element 228 and/or the aft body heating element 232. In some embodiments, the centerbody 210 may include a centerbody thermal insulation layer 234 positioned between the force balance 214 and the centerbody heating element 228. In some embodiments, the aft body 222 may include an aft body thermal insulation layer 236 positioned between the force balance 214 and the aft body heating element 232.

In some embodiments, the centerbody 210 may be at least partially hollow and/or may include one or more centerbody sensors 238 positioned therein. For example, the centerbody sensor 238 may be a temperature sensor (e.g., thermocouple), rate gyro, GPS unit, accelerometer, radar device, pressure sensor (e.g., static pressure sensor), magnetometer, timing clock, and/or optical sensor. In some embodiments, the one or more centerbody sensors 238 may provide information to a microprocessor 240 that may allow the fluid sensing device 200 to be autonomous.

For example, the one or more centerbody sensors 238, in coordination with the force balance 214 may provide information to the microprocessor that allows the fluid sensing device to self-calibrate and/or report fluid information to a user without the user needing to calibrate the fluid sensing device 200. In some embodiments, the centerbody sensor 238 may be an accelerometer that allows the fluid sensing device to measure the probe acceleration.

Similarly, the one or more centerbody sensors 238 may include a pressure sensing device in communication with the microprocessor 240 and at least one other pressure sensing device in data communication with the microprocessor 240 (for example, located in the aft body 222 and/or in the outer shell 202). The one or more centerbody sensors 238 may allow the microprocessor to compensate for changes in air pressure and density without manual calibration from a user.

In other embodiments, the microprocessor 240 may receive input from one or more sensors in the fluid sensing device 200, including the one or more centerbody sensors 238, the force and moment balance 214, and other sensors positioned on the aft body 222 and/or outer shell 202. Based on the received input (e.g., an input of static pressure, total temperature, and total pressure), the microprocessor 240 may calculate one or more outputs. For example, the microprocessor 240 may calculate a flow/flight Mach number, a fluid static temperature, entropy (including local entropy), other time-resolved data, local speed of sound, fluid static density, flow dynamic pressure, flow/flight speed, unit Reynolds number, other outputs, or combinations thereof.

Figure 3:
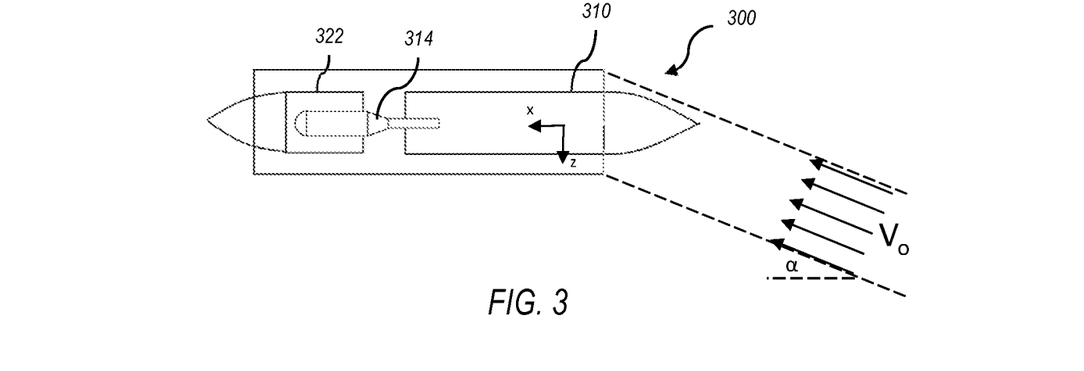
FIG. 3 is a side schematic representation of a fluid sensing device receiving a fluid stream at an angle to the fluid sensing device, according to an embodiment of the present disclosure.

In some embodiments, the force and moment balance 214 may measure the force applied to and/or movement of the centerbody 210 relative to the rest of the fluid sensing device 200 in real time. For example, the force balance 214 may have a sampling rate of greater than 1.0 kilohertz (kHz). In other examples, the force balance 214 may have a sampling rate of greater than 10.0 kHz. In yet other examples, the force balance 214 may have a sampling rate of greater than 100.0 kHz, depending on the applications and the requirements The real-time sampling rates of the force balance 214 allow for real-time fluid stream velocity vector and/or real-time turbulence measurements. FIG. 3 schematically illustrates a fluid sensing device 300 according to the present disclosure positioned in a fluid stream oriented at an angle to the longitudinal axis 312 of the fluid sensing device 300 and/or the centerbody 310. The local airspeed is of unknown magnitude, $V_0$, and direction. In the body coordinate system, (x, y, z), the local fluid stream velocity vector may be written in terms of its components:

$$\vec{V}_0 = V_x \hat{i} + V_y \hat{j} + V_z \hat{k} \tag{1}$$

The laws of conservation of mass, momentum (in three directions) and energy may be applied to the fluid stream that enters the fluid sensing device 300, as described herein.

Conservation of Mass

The conservation of mass is applied to a streamtube that enters the fluid sensing device 300 with an inlet area, $A_1$, and exit area, $A_2$:

$$\rho_1 V_{x1} A_1 = \rho_2 V_{x2} A_2 \tag{2}$$

$V_{x1}$ is the normal component of the inlet flow to the inlet area, $A_1$, and $V_{x2}$ is also the normal component of the exit velocity and the area at the probe exit face, $A_2$. The variation of fluid density between freestream, $\rho_0$, and the fluid density at the probe entrance and exit is assumed to be small, i.e., $\rho_0 = \rho_1 = \rho_2$.

Conservation of Momentum in the X-Direction

X-direction is the principal body axis of the probe. Assuming steady flow, the net rate of change of axial momentum entering the probe may be written and set equal to the net external forces acting on the fluid in the x-direction.

$$\rho_0 V_x A_1 \bar{v}_w - \rho_0 V_x A_1 (V_x) \cong -D_{CB} \tag{3}$$

where $v_w$ is the mean wake speed downstream of the centerbody, $A_1$ is the probe inlet flow area, and $D_{CB}$ is the centerbody drag.

Equation 3 is quadratic in $V_x$, with the following solution:

$$V_x = \frac{\bar{v}_w}{2}\left[1 + \sqrt{\frac{4 D_{CB}}{\rho_0 A_1 \bar{v}_w^2}}\right] \tag{4}$$

The mean wake speed is measured by the pressure transducer in the aft tube, i.e., downstream of the centerbody, according to Bernoulli equation (for low-speed applications):

$$\bar{v}_w \cong \sqrt{\frac{2(\bar{p}_{tw} - p_0)}{\rho_0}} \tag{5}$$

where $p_{tw}$ is the mean total pressure in the centerbody wake, $p_0$ and $\rho_0$ are the static pressure and density of fluid, respectively.

Note that the right-hand sides of equations 4 and 5 are comprised entirely of measured terms. For example, $D_{CB}$ is measured by the force balance 314, the mean total pressure in the wake is measured by the pressure transducer in the aft body 322, and the mean wake velocity is based on the measured wake total pressure. Hence equations 4 and 5 identify the axial component of the fluid stream velocity vector, $V_x$.

Conservation of Momentum in the Y-Direction

A similar steady momentum equation may be applied in the y-direction to a stream tube that possesses y-momentum at the inlet to the probe, but experiences diminished y-momentum as it exits the probe. The exit y-momentum may be assumed to be negligibly small (due to probe length) compared to the inlet y-momentum, therefore:

$$-\rho_0 V_x A_1 (V_y) \cong -F_y \tag{6}$$

Isolating $V_y$, provides:

$$V_y \cong \frac{F_y}{\rho_0 V_x A_1} \tag{7}$$

The right-hand side of equation 7 is known from measuring $F_y$ (by the centerbody force balance) and the calculated value for $V_x$ from equations 4 and 5.

Conservation of Momentum in the Z-Direction

Assuming steady flow, the momentum of the captured stream in the z-direction is balanced by the z-component of force on the fluid that is applied by the centerbody. Similarly to the y-direction, the exit momentum in the z-direction may be assumed to be negligibly small, as compared to the inlet z-momentum, namely:

$$\rho_0 V_x A_1 (V_z) \cong F_z \tag{8}$$

We isolate $V_z$, in terms of measured and calculated parameters:

$$V_z \cong \frac{F_z}{\rho_0 A_1 V_x} \tag{9}$$

Environmental Calculations

The magnitude of the local airspeed is measured by the probe to be:

$$V_0 = \sqrt{V_x^2 + V_y^2 + V_z^2} \tag{10}$$

In terms of angles of attack and yaw, we may relate these angles to fluid stream velocity components in body coordinates, namely:

$$\tan\alpha \equiv \frac{V_z}{V_x} \tag{11}$$

$$\tan\beta \equiv \frac{V_y}{V_x} \tag{12}$$

In some embodiments, a thermocouple inside the probe (in the aft body 322) may measure the stagnation temperature of flight, $T_{t0}$. By applying the law of conservation of energy for adiabatic flows to the fluid sensing device 300, the static temperature and speed of sound may be calculated.

Conservation of Energy

The captured air stream may enter the fluid sensing device 300 under adiabatic condition; i.e., the heat transfer to or from the probe wall to the airstream is negligibly small. Therefore, the law of conservation of energy in adiabatic flows may be applied, in the absence of any mechanical power exchange to provide:

$$T_{t0}=T_{t1}=T_{t2} \tag{13}$$

From total temperature (measured in the aft stagnation chamber) and the flight speed, the static temperature of flight may be calculated by:

$$T_0 = T_{t0} - \frac{V_0^2}{2c_p} \tag{14}$$

The local speed of sound, $a_0$, is calculated as:

$$a_0 = \sqrt{\gamma R T_0} \tag{15}$$

The flight Mach number is thus given by:

$$M_0 = \frac{V_0}{a_0} \tag{16}$$

The stagnation pressure of flight may be calculated from measured static pressure and flight Mach number, $M_0$ according to:

$$p_{t0} = p_0 \left[1 + \frac{\gamma-1}{2} M_0^2 \right]^{\frac{\gamma}{\gamma-1}} \tag{17}$$

Figure 4:
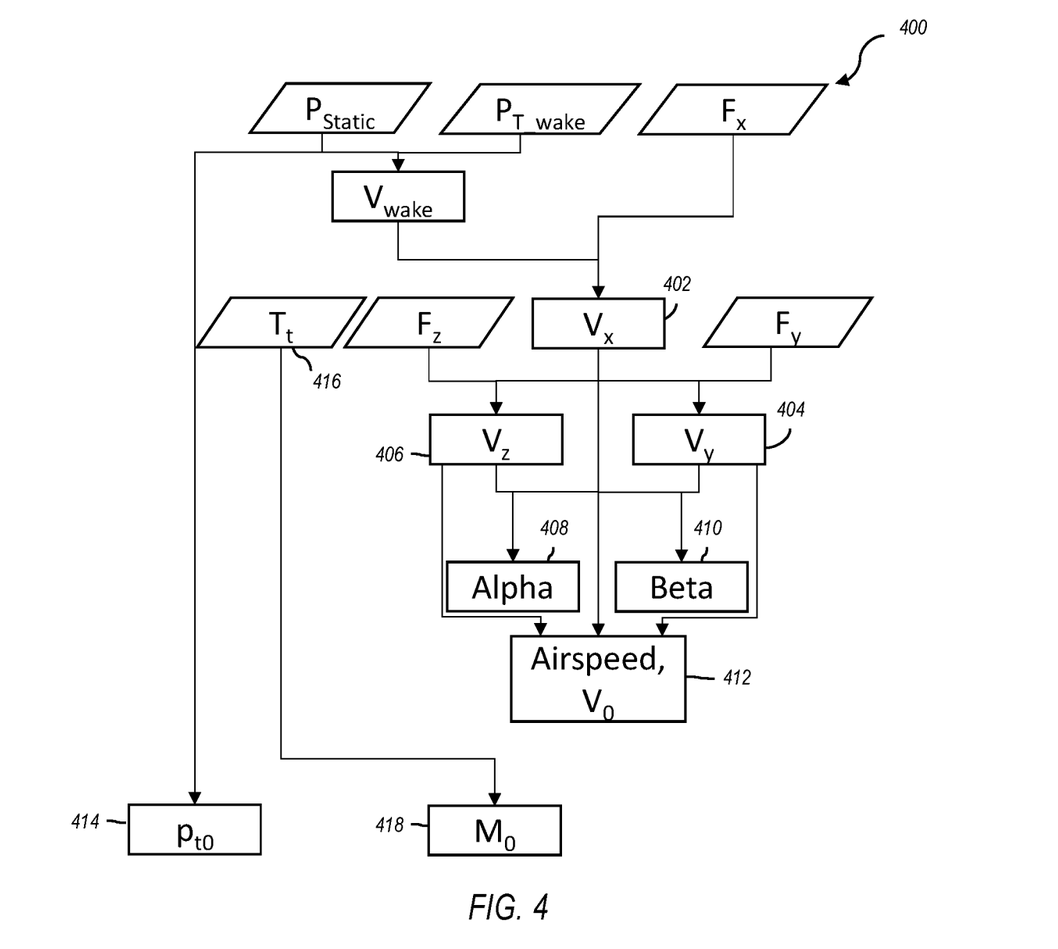
FIG. 4 is a flowchart illustrating a method of measuring fluid data with a fluid sensing device from a non-parallel fluid stream, according to an embodiment of the present disclosure.

FIG. 4 is a flowchart illustrating an embodiment of the method 400 described above. In particular, the method 400 may include the calculation of the $V_x$ 402, $V_y$ 404, and the $V_z$ 406 of the fluid entering the fluid sensing device according to the present disclosure. The attack ($\alpha$) 408 and yaw ($\beta$) 410 may further be calculated along with the net airspeed $V_0$ 412. In some embodiments, the method 400 may include steps leading to additional captured flowfield parameters including the stagnation pressure $p_{t0}$ 414, stagnation temperature $T_t$ 416, Mach number $M_0$ 418, and other derived fluid properties, e.g., entropy and density.

Considering the noisy and biased nature of sensors, particularly force sensors, an extended Kalman filter (EKF) may be used. An EKF helps estimate biases, especially in the airflow angles and air speed measurements, to reduce uncertainties and estimate consequent corrections. Availability of airflow angles and air velocity and other sensors of the fluid sensing device, or in data communication with the fluid sensing device, (e.g. IMU, GPS, etc.) allow estimation of other aircraft states if needed. In addition to minimizing impact of uncertainties in measurements, the EKF uses the measured airspeed, airflow angles, GPS velocity (velocity in the inertial coordinate system), and aircraft attitude and rate gyros to estimate relative North, East, Down (NED) wind components. Taking advantage of accurate measurements of airflow angles, the estimation of relative wind would not be impacted by the air angularity effects. In other embodiments, other statistical filters may be used.

Figure 5:
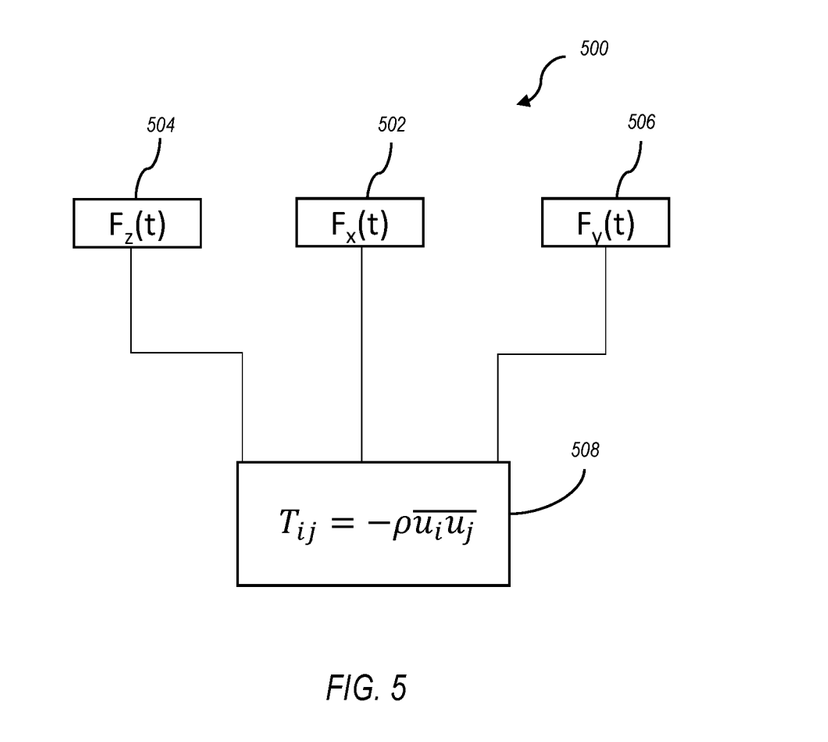
FIG. 5 is a flowchart illustrating a method of measuring real-time turbulence data from a fluid stream, according to an embodiment of the present disclosure.

FIG. 5 is a flowchart illustrating an embodiment of a method 500 of real-time turbulence reporting. In some embodiments, the measured forces $F_x(t)$ 502, $F_z(t)$ 504, and $F_y(t)$ 506 that are measured in real time by the force balance may be used to provide a real-time value of the atmospheric turbulence 508 experienced by the fluid sensing device.

The value of the atmospheric turbulence 508 is given by:

$$T_{ij} = -\rho \overline{u_i u_j} \tag{18}$$

where $\rho$ is the density of the fluid and $u_i$ and $u_j$ are the fluid stream velocity fluctuations in at least two directions.

In some embodiments, a fluid sensing device according to the present disclosure may allow for the direct measurement of real-time turbulence in a fluid stream. In at least one embodiment, a fluid sensing device according to the present disclosure may allow for the direct measurement of real-time turbulence, flow speed and directions in a fluid stream in sub-freezing conditions through the combined heating of an outer shell and an inner centerbody to limit and/or prevent icing of the fluid sensing device or ice accumulation on the probe.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A fluid sensing device, the fluid sensing device comprising:
    an outer shell, the outer shell having an inlet at a first end of the outer shell, an aft vent at an opposing second end of the outer shell, and an interior space connecting the inlet and the aft vent;
    a three-axis force and moment balance positioned in the interior space of the outer shell;
    a strut connected to the outer shell and the three-axis force balance, the strut supporting the three-axis force balance in the interior space; and
    a centerbody, at least a portion of the centerbody positioned in the interior space of the outer shell, the centerbody being connected to the three-axis force and moment balance such that the three-axis force balance is configured to measure force and/or movement of the centerbody relative to the outer shell.

2. The fluid sensing device of claim 1, wherein the device includes only one strut connected to the outer shell and supporting the centerbody in the interior space.

3. The fluid sensing device of claim 1, wherein the device includes three struts connected to the outer shell and supporting the centerbody in the interior space.

4. The fluid sensing device of claim 1, wherein the three-axis force and moment balance couples the centerbody to the strut.

5. The fluid sensing device of claim 1, wherein force and moment balance is integrated with the strut to form a single component that contains the means of measuring force and movement.

6. The fluid sensing device of claim 1, at least a portion of the centerbody positioned outside the interior space proximate the inlet.

7. The fluid sensing device of claim 1, the centerbody including a centerbody heating element.

8. The fluid sensing device of claim 7, the outer shell including an outer shell heating element.

9. The fluid sensing device of claim 7, further comprising a thermal insulation layer between the three-axis force and moment balance and the centerbody heating element.

10. The fluid sensing device of claim 1, the three-axis force and moment balance configured to measure three moments of the centerbody.

11. The fluid sensing device of claim 1, further comprising one or more sensing devices positioned in the centerbody.

12. The fluid sensing device of claim 11, the one or more sensing devices including an accelerometer.

13. The sensor of claim 1, further comprising a pressure sensor configured to measure air pressure in an aft stagnation interior space aft of the three-axis force and moment balance.

14. The sensor of claim 1, further comprising a temperature sensor configured to measure air temperature in an after aft stagnation interior space aft of the three-axis force and moment balance.

15. A method of measuring fluid movement data from a fluid stream, the method comprising:
    positioning a fluid sensing device including a three-axis force balance in the fluid stream where the fluid stream has an orientation and the fluid sensing device has a longitudinal axis;
    measuring with the fluid sensing device an x-direction force acting on the device relative to time ($F_x(t)$) in a direction of the longitudinal axis, a y-direction force acting on the device relative to time ($F_y(t)$) transverse to the longitudinal axis, and a z-direction force acting on the device relative to time ($F_z(t)$) transverse to an x-direction and a y-direction; and
    using the measurements of the x-direction force, y-direction force, and z-direction force to calculate in real time an x-direction velocity of the fluid stream relative to time ($Vx(t)$) in a direction of the longitudinal axis, a y-direct velocity of the fluid stream relative to time ($Vy(t)$) transverse to the longitudinal axis, and a z-direction velocity of the fluid stream relative to time ($Vz(t)$) transverse to an x-direction and a y-direction of the fluid stream.

16. The method of claim 15, further comprising calculating turbulence, including turbulence intensity, in real time from a moving fluid stream, the method comprising:
    calculating in real time a velocity fluctuation in at least one of an x-direction, a y-direction, or a z-direction; and
    reporting the velocity fluctuation and turbulence intensity to a user in real time.

17. The method of claim 15, measuring the x-direction force relative to time ($F_x(t)$), the y-direction force relative to time ($F_y(t)$), and the z-direction force relative to time ($F_z(t)$) of the fluid stream acting on the fluid sensing device including:
    an outer shell, the outer shell having an inlet at a first end of the outer shell, an aft vent at an opposing second end of the outer shell, and an interior space connecting the inlet and the aft vent,
    the three-axis force balance positioned in the interior space of the outer shell;

a strut connected to the outer shell and the three-axis force and moment balance, the strut supporting the three-axis force balance in the interior space, and a centerbody, at least a portion of the centerbody positioned in the interior space of the outer shell, the centerbody being connected only to the three-axis force and moment balance such that the three-axis force and moment balance is configured to measure force and/or movement of the centerbody relative to the outer shell; and the method further including contacting the fluid stream with the centerbody of the fluid sensing device.

18. The method of claim 15, further comprising:

calculating in real time a fluid stream velocity magnitude ($V(t)$) and the fluid stream orientation relative to the longitudinal axis from the measured x-direction velocity relative to time ($V_x(t)$), y-direction velocity relative to time ($V_y(t)$), and z-direction velocity relative to time ($V_z(t)$) in real time.

19. The method of claim 15, further comprising measuring a stagnation temperature of flight aft of the centerbody with a temperature sensor and further using the measured stagnation temperature and fluid stream velocity to calculate the static temperature.

20. The method of claim 15, further comprising measuring the air pressure in an aft stagnation chamber aft of the three-axis force and moment balance.

\* \* \* \* \*